United States Patent [19]
Candelore

[11] Patent Number: 5,880,523
[45] Date of Patent: Mar. 9, 1999

[54] ANTI-TAMPER INTEGRATED CIRCUIT

[75] Inventor: Brant Candelore, San Diego, Calif.

[73] Assignee: General Instrument Corporation, Horsham, Pa.

[21] Appl. No.: 806,530

[22] Filed: Feb. 24, 1997

[51] Int. Cl.$^6$ .............................. B11C 11/407; G11C 7/00
[52] U.S. Cl. .................... 257/679; 257/922; 257/724; 257/691; 365/229; 365/228
[58] Field of Search ................................ 257/922, 679, 257/678, 730, 724, 691, 692; 365/189.01, 53, 96, 104, 114, 185, 226, 229, 228, 63

[56] References Cited

U.S. PATENT DOCUMENTS

| | | | |
|---|---|---|---|
| 3,934,122 | 1/1976 | Riccitelli | 257/679 |
| 4,004,133 | 1/1977 | Honnan et al. | 257/701 |
| 4,105,156 | 8/1978 | Nethloff | 257/922 |
| 4,593,384 | 6/1986 | Kleijne | 257/679 |
| 5,299,046 | 3/1994 | Spaeth et al. | 257/922 |
| 5,389,738 | 2/1995 | Piosenka et al. | 257/787 |
| 5,535,148 | 7/1996 | Yepez, III et al. | 257/922 |
| 5,576,988 | 11/1996 | Kuo et al. | 257/922 |

*Primary Examiner*—Alexander Oscar Williams
*Attorney, Agent, or Firm*—Barry R. Lipsitz; Ralph F. Hoppin

[57] ABSTRACT

An anti-tamper integrated circuit (IC) apparatus is adapted for use with an IC that carries an active component, such as a secure processor, which requires a constant power signal to operate. If the power signal is interrupted, data is erased from a volatile memory of the secure processor. The memory is located within the IC package. An external power signal is coupled to the memory via a conductive path which is carried outside the housing and which may be embedded in a decoder board, micro-module substrate, or smart card body in which the IC is carried. The conductive path may carry the power signal directly to the memory, or it may carry the power signal to bias a transistor. Removal of the IC package from the decoder board, micro-module substrate or smart card, will open the conductive path and interrupt the power signal to the memory by causing a short circuit or an open circuit. As a result, the data stored in the memory will be lost. The apparatus therefore deters a pirate from tampering with the IC.

24 Claims, 3 Drawing Sheets

ANTI-TAMPER INTEGRATED CIRCUIT

BACKGROUND OF THE INVENTION

The present invention relates to the protection of integrated circuits (ICs), and more particularly, to a scheme for preventing the reverse engineering of ICs. The invention is particularly useful in protecting secure ICs which are used in cable and satellite television decoders to prevent unauthorized users from receiving television broadcasts. The invention is equally useful in protecting secure ICs used in other applications, including terminals and smart cards for electronic funds transactions, premises access control, electronic games, and the like.

Due to the continuing popularity of the pay television market, there exists a tremendous financial motivation for unauthorized persons known as "pirates" to modify the access control of set-top boxes (e.g., decoders) to allow the reception of television programming without payment of the required subscription fees. The modified decoders are purchased by unscrupulous individuals through various markets and used to illegally receive and view the television signals.

To produce a modified decoder, a pirate must extract certain information from a genuine decoder, which is usually known only by the authorized manufacturer. The decoder typically includes a secure (e.g., cryptographic) processor which contains information such as cryptographic keys which are used in descrambling a scrambled television signal or other programming service signal (e.g., audio or data). Since the secure processor performs access control functions, it is a focal point of the pirate's attention. Accordingly, the pirate will employ various techniques in an attempt to gain information from the secure processor.

One common attack technique is known as "probing." A secure processor includes an integrated circuit (IC) which is fabricated as a monolithic device with an ensemble of active and passive components, including transistors, resistors, capacitors, and diodes which are interconnected within a monolithic block of semiconductor material. The IC may be located in a housing which is installed on a decoder board, or may be part of a micro-module which is embedded in a smart card. During probing, ICs such as very large scale integrated (VLSI) circuits are subject to an invasive attack wherein the die (e.g., IC or "chip") is exposed by decapsulation. During decapsulation, the compound material which encapsulates or surrounds the die is systematically removed. Then, probes which measure current and other parameters are used to monitor the electronic signals in the active components of the chip.

A pirate may perform the following decapsulation steps to prepare a chip for probing. First, the chip is removed from the decoder board, with the die still inside the IC package. Generally, this is the case when a chip is mounted on a large board. Second, the location of the die within the encapsulating compound of the IC package can be determined by taking an x-ray of the IC package. Third, a mechanical grinder can be used to remove as much of the encapsulating compound as possible above the top surface of the die without damaging the die. Fourth, chemical etching or plasma etching is performed to remove the last portions of encapsulating compound which remain over the area of the die which is to be probed. Some chemical etchants work so well on the encapsulating compound that the grinding step can often be skipped.

The decoder board may be a computer board such as those used in a personal computer (PC). Typically, the chip requires a direct current from a battery or other power source to maintain the contents of a volatile memory, such as a random access memory (RAM). In this case, the battery wires are soldered to a positive pin (e.g., $V_{batt}$) and to a negative pin (e.g., $V_{ss}$) on the outside of the chip prior to removal from the board. The chip is then removed from the board with the battery wires still attached. If the battery power is interrupted, the chip will "self-destruct" by erasing (e.g., losing) critical information stored in memory. The pirate can identify the appropriate battery pins by taking resistance measurements of the traces on the board which are connected to the battery, and then confirming by taking voltage readings of the traces with a main voltage (e.g., $V_{cc}$) off.

The IC must be removed from the decoder board since the equipment used by the pirate in the subsequent decapsulizing steps cannot accommodate the large footprint of the large decoder board. Commercial decapsulation stations which use chemical etchants can accommodate only relatively small decoder boards. This is true since the IC must be placed in a chamber to protect the operator from the etchants, which can be toxic. Often, a small vacuum is created in the chamber to prevent etchant fluid and spray from escaping. Such chambers are typically limited in size due to the increased expense and time associated with evacuating a larger volume chamber.

Alternatively, the IC may be provided in a micro-module, which is plug-in, miniature circuit composed of micro-elements such as resistors, capacitors, and/or transistors. The die of the micro-module may be fabricated within a substrate matrix. One surface of the substrate matrix contains contacts, while the die is wire-bonded to the opposing surface. The micro-module is carried within a cavity of a card body. Commonly, a pirate extracts the micro-module from the card body and positions the micro-module to gain access to the contact area. The contact area is glued to a mounting surface, and the surface of the die is exposed to allow removal of the epoxy adhesive which is used to secure the die within the card body.

Thus, the pirate's task is made easier when the chip is consolidated into a smaller form factor of the chip itself or a much smaller board. The present invention is directed toward making it more difficult for the pirate to remove an IC from a board or micro-module, or to remove a micro-module from a smart card.

In current chip designs, including those for application specific ICs (ASICs), a pirate will generally not encounter significant obstacles in performing the four steps above. Removal of the chip from the board with the battery wires still attached is usually considered to be the most delicate operation. Thus, the undamaged die, which is protected by an inert glassivation coating, can be exposed by a pirate as long as a short circuit or open circuit of the battery power is not created. Furthermore, damage to bond wires can also easily be avoided. Bond wires connect bond pads of the chip to package pads in the protective encapsulating package, and are located on the periphery of the device. Once the die is exposed without causing either shorting or opening of the power supply to the chip, then probing can begin. If the removal of the chip from the board or micro-module that it is connected to can be prevented or otherwise hindered, then piracy may be made more difficult or avoided altogether.

One approach to deterring probing is discussed in commonly-assigned U.S. Pat. No. 4,933,898, issued Jun. 12, 1990 to Gilberg et al., entitled "Secure Integrated Circuit Chip With Conductive Shield." Gilberg et al. disclose using one or more conductive layers to overlay a secure area of an IC. The conductive layers shield the secure area from inspection and carry a power signal to the IC. Removal of one of the layers by a pirate causes the loss of power to the components of the secure area. However, this approach does not directly address the problem of removal of an IC from a decoder board or smart card.

Accordingly, it would be desirable to provide an apparatus which deters tampering of IC chips by a pirate. In particular, it would be desirable to make the pirate's task of removing an IC from a decoder board, micro-module substrate or smart card body without damaging the IC more difficult. Furthermore, the apparatus should be compatible with existing chip designs and inexpensive to implement.

It would also be desirable to provide an apparatus which makes focused ion beam deposition more difficult. Ion beam deposition devices are used to inject charged atoms or molecules into a die, and typically use a small evacuated chamber to hold the die. Evacuation of the chamber is made more difficult if the die is left on a board or micro-module substrate due to outgassing (e.g., the release of absorbed gases by heating) of the board or substrate. By making it more difficult and risky for a pirate to remove the die from the board or micro-module, the pirate's handling costs are increased since the required period to evacuate the chamber is increased.

The present invention provides an apparatus having the above and other advantages.

SUMMARY OF THE INVENTION

In accordance with the present invention, an anti-tamper integrated circuit (IC) apparatus is presented. The apparatus is adapted for use with an IC which carries an active component such as a secure processor which requires a constant power supply to operate. If the power supply is interrupted, data is erased from a volatile memory of the secure processor.

The anti-tamper integrated circuit (IC) apparatus includes an IC body, which is a housing in which the IC is packaged before being installed in a decoder board or smart card. An active component, such as a secure processor, is disposed within the body.

In a first embodiment, a set of redundant pins which are associated with the IC body are provided for coupling a power signal which is external to the IC body to the active component via an electrical path. The power signal allows the active component to function. A switch such as a transistor is disposed within the IC body, and receives the power signal via at least one of the redundant pins. The switch is adapted to interrupt the power signal to the active component when the power signal to at least one of the pins is interrupted. The power signal may be interrupted, for example, when the IC body is removed from a decoder board or smart card. The switch may be adapted to provide a short circuit or open circuit of the electrical path when the power signal to at least one of the pins is interrupted. The active component may comprise a secure memory such as a RAM for storing cryptographic data, where an interruption of the power signal to at least one of the pins causes the erasure of the cryptographic data.

In a second embodiment, first and second primary pins associated with the IC body are provided for coupling the power signal to the active component. A first spare pin is electrically coupled to one of the first and second primary pins via a first electrically conductive member such as a trace, and a second spare pin is electrically coupled to the first spare pin via a second electrically conductive member. At least one of the first and second electrically conductive members extends, at least in part, outside the IC body. The power signal is coupled to the active component via a serial path which includes the first and second primary pins and the first and second spare pins.

Optionally, at least one of the first and second electrically conductive members is embedded, at least in part, within a board, micro-module substrate or smart card which carries the IC body such that removal of the IC body from the board, micro-module substrate or smart card interrupts the coupling of the power signal via the serial path to the active component. The active component may comprise a secure memory for storing cryptographic data, where an interruption of the power signal in the serial path causes the erasure of the cryptographic data.

In a third embodiment, the active component comprises a plurality of segments which are disposed within the body. A corresponding plurality of pins associated with the IC body are provided for coupling a power signal to the segments via respective internal electrically conductive paths which are internal, at least in part, to the IC body. The power signal allows the segments to function. The pins receive the power signal via an external electrically conductive path which extends, at least in part, outside the IC body. The coupling of the power signal to at least one, if not all, of the plurality of segments is interrupted when the power signal is no longer carried via the plurality of pins.

Optionally, the external electrically conductive member is embedded, at least in part, within a board, micro-module substrate or smart card which carries the IC body such that removal of said IC body from the board, micro-module substrate or smart card interrupts the carrying of the power signal via the plurality of pins. However, the conductive member need not be hidden. For example, the IC may be carried in a two-sided board that has no additional layers, where conductive traces are located on a top surface of the board. In such a case, some effort can be made to run traces beneath the IC. The mere handling of power at the pin or pad will cause a problem.

The active component segments may comprise a secure memory for storing cryptographic data, where an interruption of the power signal to the plurality of pins causes the erasure of the cryptographic data.

DETAILED DESCRIPTION OF THE INVENTION

An anti-tamper integrated circuit (IC) is presented for preventing active components, such as a secure processor used in a television decoder, from being tampered with (e.g., reverse engineered). In particular, any attempt to remove the IC from a PC board, smart card, or other location in which the IC is installed will interrupt a power signal of the active component and result in the loss of data.

Figure 1:
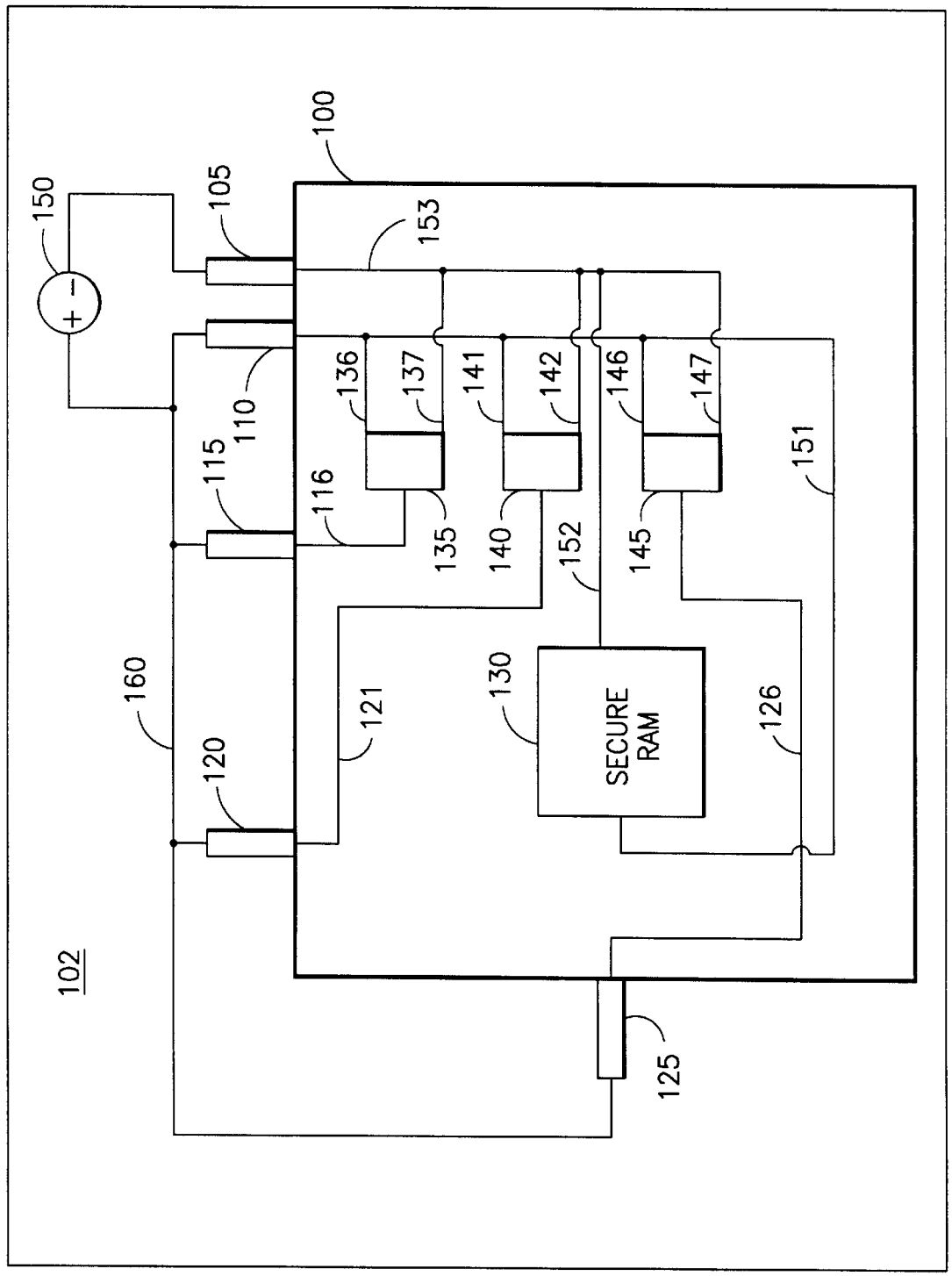
FIG. 1 is a simplified diagram illustrating a first embodiment of the anti-tamper integrated circuit (IC) in accordance with the present invention.

FIG. 1 is a simplified diagram illustrating a first embodiment of the anti-tamper integrated circuit (IC) in accordance with the present invention. The IC 100 includes an active component such as a secure random access memory (RAM) 130 which is part of a secure processor. A central processing unit (CPU) of the secure processor, not shown, may transfer data to and from the memory 130. The RAM 130 is a volatile memory which requires a continuous power signal to maintain its contents.

A wire or other electrically conductive member 151 and pin 110 couple a positive terminal (e.g., $V_{batt}$) of a voltage source 150 with the RAM 130. The pin 110 and voltage source 150 are typically external to the IC 100. The term "pin" as used herein is meant to encompass any electrically conductive terminal. Similarly, electrically conductive members 152 and 153, and a pin 105, couple a negative terminal (e.g., $V_{ss}$) of the voltage source 150 with the RAM 130. Pins 105 and 110 are primary pins. In a nominal operating mode, the power signal is carried from the positive terminal of the battery 150, to the RAM 130 via pin 110 and lines 151, and back to the negative terminal of the voltage source via lines 152 and 153 and pin 105. Of course, it will be understood that the polarity of the voltage source 150 may be reversed.

In accordance with the present invention, means are provided for interrupting the power signal to the RAM 130. In particular, one or more secondary, or spare, pins 115, 120 and 125 are provided for carrying the power signal to switches 135, 140 and 145, respectively. The power signal provided from the positive terminal of the voltage source 150 is coupled to an electrically conductive member (e.g., line, wire or trace) 160 which extends from pin 110 to pin 125. Pins 115 and 120 also tap into the line 160. Although three spare pins are shown, and any number can be provided, it will be appreciated that only one spare pin need be used to accomplish the scheme of the present invention.

Pin 115 provides the positive power signal to a switch 135 via line 116. The switch 135 is coupled to line 151 via line 136, and to line 153 via line 137. The switch 135 may comprise a transistor such as a field effect transistor (FET), although those skilled in the art will appreciate that other types of switching devices may be employed. A FET is characterized by a gate voltage which controls the amount of source current which enters the transistor and the amount of drain current which exits the transistor. If the gate voltage is below a threshold value, no current flows through the transistor. If the gate voltage exceeds the threshold value, current flows through the transistor. Thus, the transistor can act as a switch which has two modes. In a first mode, the transistor has a low resistance, and current is easily passed, while in a second mode, the transistor has a very high resistance, and essentially no current is passed.

If the switch 135 is a transistor, the power signal provided via line 116 can bias the transistor to a mode where no current is passed between lines 136 and 137. Similarly, the switch 140 can be biased via pin 120 and line 121 such that no current passes between lines 141 and 142, and the switch 145 can be biased via pin 125 and line 126 such that no current passes between lines 146 and 147. This represents a nominal operating mode of the IC 100, where the switches 135, 140 and 145 act as infinite resistances.

In the event that a pirate attempts to remove the IC 100 from a carrier 102, such as a decoder board, smart card or micro-module in which the IC is installed, the configuration of FIG. 1 will present a number of obstacles. First, the pirate will need to ensure that the proper power signal is maintained at each of the pins 105, 110, 115, 120 and 125. Thus, instead of requiring only two battery connections, e.g., via pins 105 and 110, to supply the requisite power to the memory 130, the pirate must provide one or more additional battery connections via the spare pins 115, 120 and 125. The current carried by the pins 105, 110 is generally on the order of several micro-amps, although the maximum capacity of the pins is typically one thousand to ten thousand times greater. In the current state of the art, the current carried by the pins may back up a memory having about two kilobytes of random access memory (RAM).

In practice, the pirate connects a new voltage source (e.g., battery) to the IC 100 before attempting to remove the IC from the board or smart card. However, a tremendous amount of care must be taken to solder a battery to an IC prior to removal from a board. The new battery is coupled via new leads and wires which replace those supplied by the board or the smart card. Once the IC is connected to the new battery, then the connections between the IC and the old battery must be broken so that the IC may be lifted off the board.

The pirate will face various problems while attempting to sever the connections between the IC and the old battery. In particular, while trying to use heat to break the solder connections to the old battery, one or more of the connections to the new battery can be severed as well, resulting in the interruption of the power signal to the IC 100 and the erasure of the data in the volatile memory 130. Additionally, if the electrical connections between the IC and the new battery were made with solder that was not at the proper temperature, weak joints known as cold solder joints may have formed. Such joints are particularly prone to failure when the new connections are handled.

In fact, handling of the IC can cause significant stresses on the new battery leads which are coupled to the IC package. Alternatively, when the IC is housed in a micro-module, stresses may be induced in bond wires which couple the new battery to the micro-module. These stresses can cause the pins or other coupling elements to literally fall off the IC package. When this happens, all volatile contents in the memory 130 are lost. Additionally, accidental shorting of the battery leads of the IC can occur if the IC is handled carelessly by the pirate. With the present invention, such a short circuit also interrupts the current flow to the IC and causes the loss of data in the memory 130.

To avoid the problems of an open circuit or short circuit of the power signal to the IC, a pirate may choose to leave the IC on the decoder board or in the micro-module. In this case, the pirate may attempt to cut away a portion of the board which includes the IC. Or, when the IC is carried in a micro-module of a smart card, the pirate may attempt to cut away the micro-module from the micro-module substrate and the smart card body. Such attempts may lower the pirate's time and expenses in handling the IC, but will destroy the board. The expense of destroying an entire board is usually significant and will represent a significant deterrent to the pirate. Additionally, if the board is left intact, special handling by the pirate will be required at a wet etchant decapsulation station. Furthermore, if the board can be accommodated in a focused ion beam chamber, the chamber will require a longer time to evacuate due to outgassing, as discussed previously.

Thus, by increasing the number of pins that must be connected to the new battery to maintain the power signal to the IC 100, the odds that a pirate will botch the reverse engineering procedure and render the IC useless are increased.

Additionally, all or part of the wire or trace 160 may be embedded (e.g., buried) in the board or smart card on which the IC 100 is mounted. Typically, a decoder board comprises a multi-layered structure. The line 160 may be embedded in the board such that, when the IC is removed from the board, the conductive path 160 is not severed, but the current to the chip is interrupted due to a short circuit between lines 151 and 153. For example, if the proper current is not supplied to pin 125 then the power signal which is nominally provided to the switch 145 via line 126 will be interrupted. In this case, the switch 145 will cause a current to flow between lines 146 and 147, thereby short circuiting lines 151 and 153.

Similarly, it the proper current is not supplied to pins 115 and 120, either of switches 140 and 145, respectively, will short circuit the power signal to the memory 130. Thus, by arranging the spare pins 115, 120 and 125, and the line 160 in strategic locations, for example, around the periphery of the IC 100, it is possible to provide numerous "traps" for the pirate which can cause the interruption of the power signal to the IC 100.

The configuration shown in FIG. 1 is therefore only an example, and it will be appreciated that various numbers of spare pins and locations for the line 160 may be used. For example, the line may extend substantially around the circumference of the IC 100. Alternatively, the polarity of the voltage source 150 may be reversed, and more than one voltage supply may be used. Additionally, various switching schemes may be used. For example, the switch 135 may be arranged to provide an open circuit (rather than a short circuit) in either of lines 151 and 153 when the power signal on line 116 is interrupted.

Figure 2:
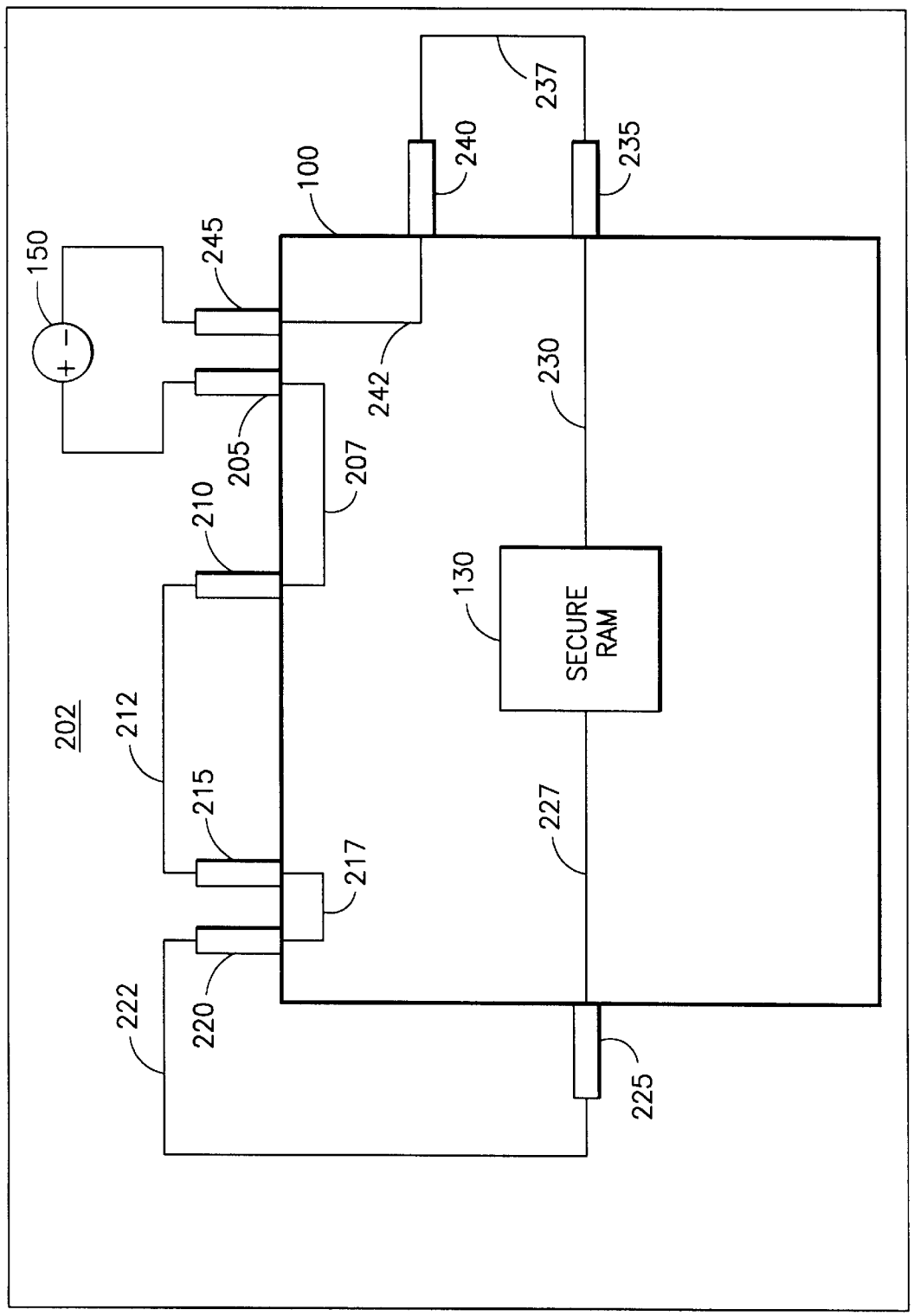
FIG. 2 is a simplified diagram illustrating a second embodiment of the anti-tamper IC in accordance with the present invention.

FIG. 2 is a simplified diagram illustrating a second embodiment of the anti-tamper IC in accordance with the present invention. Here, a signal from the voltage source 150 is coupled to the memory 130 via a number of pins and lines which are arranged serially. In particular, the positive terminal of the voltage source is coupled to a pin 205, while a negative terminal of the voltage source is coupled to a pin 245. Pin 205 is coupled to the memory 130 via line 207, pin 210, line 212, pin 215, line 217, pin 220, line 222, pin 225, and line 227. Pin 245 is coupled to the memory 130 via line 242, pin 240, line 237, pin 235 and line 230. Interruption of the current to any of the pins will interrupt the power supply to the memory 130 and cause the loss of data therein.

Additionally, a pirate can easily cause a short circuit by coupling one of the positively biased pins or lines with one of the negatively biased pins or lines. For example, if pin 225 is electrically coupled with pin 235, a short circuit across the IC 100 will occur. As a result, the power signal which is carried to the memory 130 via lines 227 and 230 will be interrupted, thereby causing the loss of data stored in the memory. Optionally, the lines or traces 212, 222 and 237 can be embedded, at least in part, into a carrier 202, such as a decoder board, smart card or micro-module on which the IC 100 is carried. This can make it more difficult to detect the presence of the traces. It will be understood that the serial embodiment of FIG. 2 is an example only, and various modifications are possible. Moreover, it is possible to combine the configurations of FIGS. 1 and 2, for example, by routing the line 160 with additional pins in a serial path that extends, in part, inside the IC 100.

Figure 3:
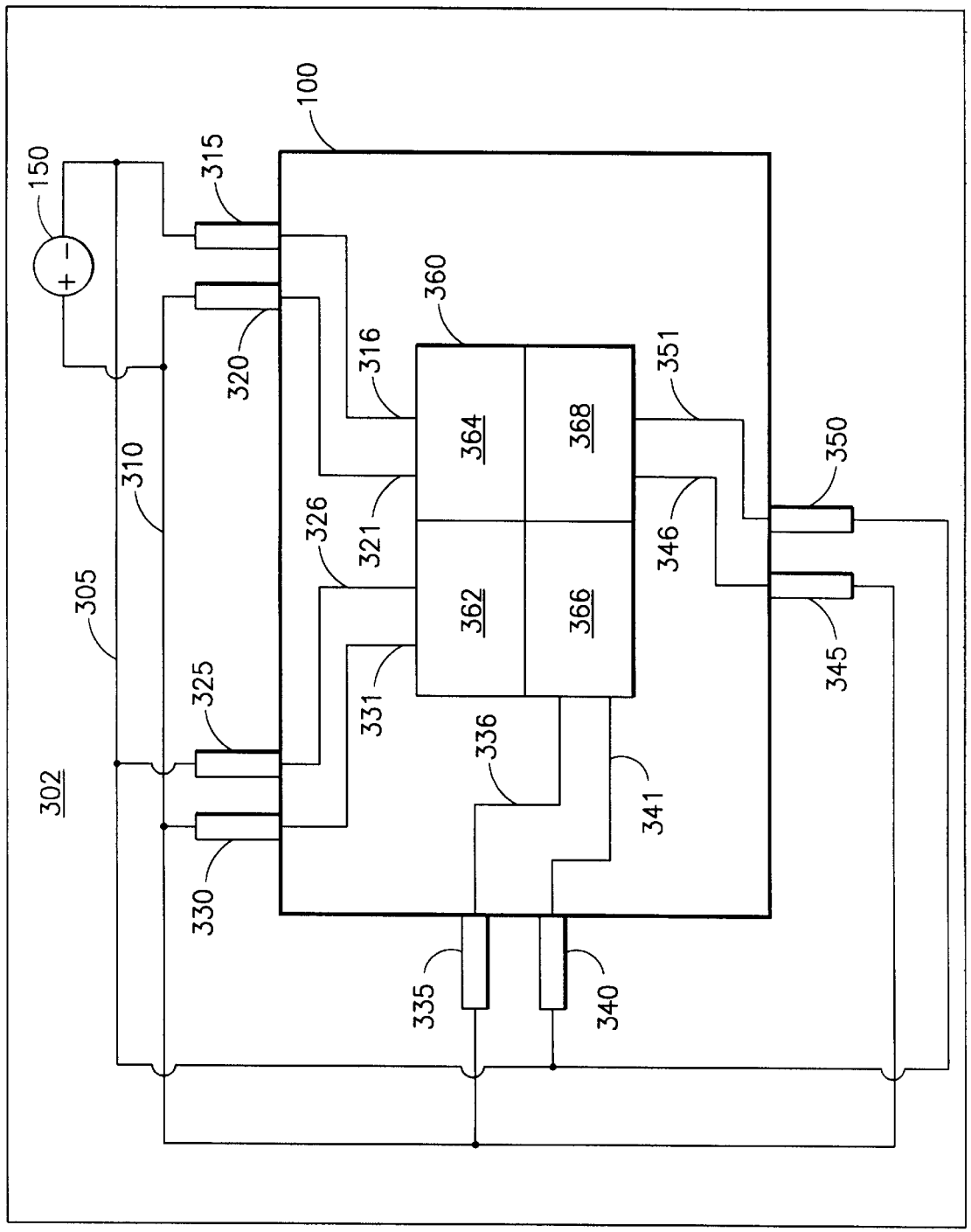
FIG. 3 is a simplified diagram illustrating a third embodiment of the anti-tamper IC in accordance with the present invention.

FIG. 3 is a simplified diagram illustrating a third embodiment of the anti-tamper IC in accordance with the present invention. Here, the IC 100 includes a segmented memory 360, with segments 362, 364, 366 and 368. Each segment receives a power signal from the voltage source 150. Thus, the voltage source 150 is common to each memory segment. In particular, a common line 310, which extends between pin 320 and pin 345, couples the positive terminal of the voltage source 150 to segment 362 via pin 330 and line 331, to segment 366 via pin 335 and line 336, to segment 368 via pin 345 and line 346, and to segment 364 via pin 320 and line 321. Similarly, a common line 305, which extends between pin 315 and pin 350, couples the negative terminal of the voltage source 150 to segment 362 via pin 325 and line 326, to segment 366 via pin 340 and line 341, to segment 368 via pin 350 and line 351, and to segment 364 via pin 315 and line 316. Optionally, the lines 305 and 310 may be partially or fully embedded in a carrier 302, such as a decoder board, smart card or micro-module in which the IC 100 is carried to make it more difficult to detect their presence.

With the configuration of FIG. 3, it can be seen that removal of the IC 100 from a decoder board or smart card will interrupt the current provided by either of lines 305 and 310, thereby interrupting the power signal which is provided to the memory segments 362, 364, 366 and 368. Additionally, the power signals to the memory segments will also be interrupted if a pirate causes a short circuit by electrically coupling lines 305 and 310.

The embodiment of FIG. 3 may be modified in a number of ways. It is possible to combine the configurations of FIGS. 2 and 3, for example, by routing either or both of the line 305 and 310 in a serial path that extends, in part, inside the IC 100. Alternatively, the embodiment of FIG. 1 may also be incorporated by coupling a switch to provide a short circuit or open circuit which interrupts the power signal of the memory segments.

Accordingly, it can be seen that there are many possible configurations of the anti-tamper IC of the present invention which prevent unauthorized removal of the IC from a decoder board, smart card, or other location in which the IC is mounted. Electrically conductive lines are arranged such that breakage or opening of one of the lines interrupts a power signal which is provided to an active component of the IC, thereby causing the loss of data stored in a volatile memory. Moreover, the interruption may be caused by an open circuit or short circuit caused by the interruption of a biasing signal at a switch such as a transistor. The pirate's task of reverse engineering the IC is therefore made much more difficult, time-consuming and expensive.

Although the invention has been described in connection with various specific embodiments, those skilled in the art will appreciate that numerous adaptations and modifications may be made thereto without departing from the spirit and scope of the invention as set forth in the claims.

What is claimed is:

1. An anti-tamper integrated circuit (IC) apparatus, comprising:
    an IC body;
    an active component disposed within said body;
    a set of pins associated with said IC body, each of which is provided at an external portion of said IC body;
    said pins including a first pin for coupling a signal from a power source which is external to said IC body to said active component via a first electrical path to allow said active component to function; and
    a first switch disposed within said IC body; wherein:
        said pins include a second pin for coupling a signal from a power source which is external to said IC body to said first switch via a second electrical path; and
        said first switch interrupts the power signal to said active component in said first electrical path when the power signal in said second electrical path is interrupted.

2. The apparatus of claim 1, wherein:
said first switch short circuits said first electrical path when the power signal to said second pin is interrupted.
3. The apparatus of claim 1, wherein:
said first switch opens said first electrical path when the power signal to said second pin is interrupted.
4. The apparatus of claim 1, wherein:
said first switch comprises a transistor which is biased by said power signal in said second electrical path.
5. The apparatus of claim 1, wherein:
said active component comprises a secure memory for storing cryptographic data; and
an interruption of the power signal to said second pin causes the erasure of said cryptographic data.
6. An anti-tamper integrated circuit (IC) apparatus, comprising:
an IC body;
an active component disposed within said body;
at least first, second and third pins associated with said IC body, each of which is provided at an external portion of said IC body;
said pins coupling a power signal which is external to said IC body to said active component via a serial electrical path to allow said active component to function;
said serial electrical path comprising at least first, second and third electrically conductive members; wherein:
said first electrically conductive member is disposed between said first and second pins;
said second electrically conductive member is disposed between said second and third pins;
said third electrically conductive member is disposed between said third pin and said active component; and
at least one of said first, second and third electrically conductive members extends, at least in part, outside said IC body.
7. The apparatus of claim 6, wherein:
at least one of said first, second and third electrically conductive members is embedded, at least in part, within a board which carries said IC body such that removal of said IC body from said board interrupts the coupling of the power signal via said serial path to said active component.
8. The apparatus of claim 6, wherein:
at least one of said first, second and third electrically conductive members is embedded, at least in part, within a smart card body which carries said IC body such that removal of said IC body from said smart card body interrupts the coupling of the power signal via said serial path to said active component.
9. The apparatus of claim 6, wherein:
at least one of said first, second and third electrically conductive members is embedded, at least in part, within a micro-module substrate which carries said IC body such that removal of said IC body from said micro-module substrate interrupts the coupling of the power signal via said serial path to said active component.
10. The apparatus of claim 6, wherein:
said active component comprises a secure memory for storing cryptographic data; and
an interruption of the power signal in said serial path causes the erasure of said cryptographic data.
11. An anti-tamper integrated circuit (IC) apparatus, comprising:

an IC body;
a plurality of active component segments disposed within said body;
a corresponding plurality of pins provided at an external portion of said IC body for coupling a power signal which is external to said IC body to said active component segments via respective internal electrically conductive paths for allowing said active component segments to function;
said internal electrically conductive paths being internal, at least in part, to said IC body;
said pins receiving said power signal via a common external electrically conductive path which extends, at least in part, outside said IC body; wherein:
said coupling of said power signal to at least one of said plurality of active component segments is interrupted when said power signal is no longer carried via at least one of said plurality of pins.
12. The apparatus of claim 11, wherein:
said coupling of said power signal to each of said plurality of active component segments is interrupted when said power signal is no longer carried via each of said plurality of pins.
13. The apparatus of claim 11, wherein:
said external electrically conductive member is embedded, at least in part, within a board which carries said IC body such that removal of said IC body from said board interrupts the carrying of said power signal in each of said plurality of pins.
14. The apparatus of claim 11, wherein:
said external electrically conductive member is embedded, at least in part, within a smart card body which carries said IC body such that removal of said IC body from said smart card body interrupts the carrying of said power signal in each of said plurality of pins.
15. The apparatus of claim 11, wherein:
at least one of said first and second electrically conductive members is embedded, at least in part, within a micro-module substrate which carries said IC body such that removal of said IC body from said micro-module substrate interrupts the carrying of said power signal in each of said plurality of pins.
16. The apparatus of claim 11, wherein:
each of said active component segments comprises a secure memory for storing cryptographic data; and
an interruption of the power signal to said plurality of pins causes the erasure of said cryptographic data.
17. The apparatus of claim 1, wherein:
the power source coupled to the first electrical path and the power source coupled to the second electrical path are the same power source.
18. The apparatus of claim 1, wherein:
the power source coupled to the first electrical path and the power source coupled to the second electrical path are different power sources.
19. The apparatus of claim 1, further comprising:
a second switch disposed within said IC body; wherein:
said pins include a third pin for coupling a signal from a power source which is external to said IC body to said second switch via a fourth electrical path; and
said second switch interrupts the power signal to said active component in said first electrical path when the power signal in said fourth electrical path is interrupted.

20. The apparatus of claim 1, wherein:

said IC body is mounted in a carrier;

said second pin is coupled to the power source associated therewith via a third electrical path that is embedded, at least in part, in the carrier; and removal of said IC body from said carrier causes breakage of said third electrical path, thereby interrupting the power signal in said second electrical path.

21. The apparatus of claim 20, wherein said carrier comprises one of:

a micro-module substrate;

a smart card body; and a board.

22. The apparatus of claim 1, wherein:

said second pin is provided at a periphery of said IC body.

23. The apparatus of claim 6, wherein:

at least one of said first, second and third electrically conductive members extends fully outside said IC body.

24. The apparatus of claim 6, wherein:

said first and third electrically conductive members extend within said IC body; and said second electrically conductive member extends outside said IC body.

* * * * *